G. J. AIGNER.
INDEX TAB.
APPLICATION FILED AUG. 5, 1918.
Reissued Nov. 19, 1918. 14,550.
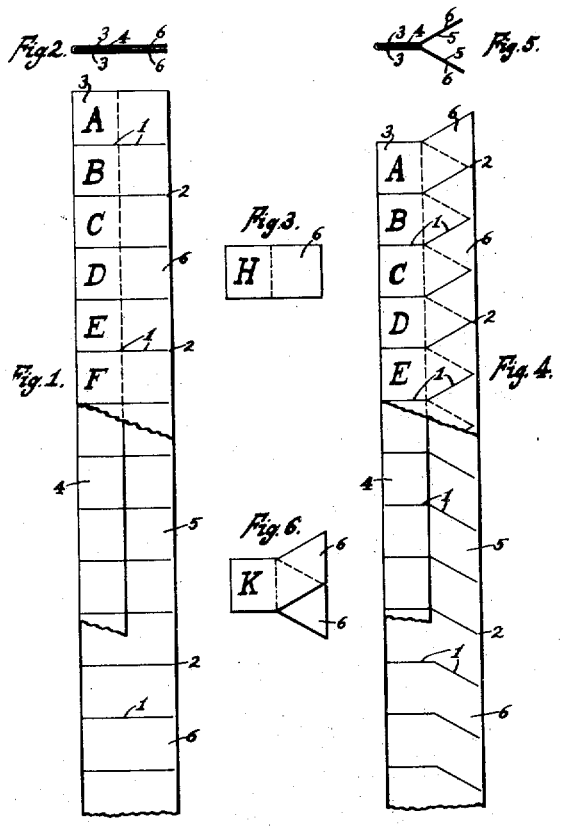
WITNESSES:
Frances K. Parker.
Lillian Rieck
INVENTOR:
George J. Aigner,
By Frederick R. Parker
ATTORNEY.

UNITED STATES PATENT OFFICE.

GEORGE J. AIGNER, OF CHICAGO, ILLINOIS.

INDEX-TAB.

14,550. Specification of Reissued Letters Patent. Reissued Nov. 19, 1918.

Original No. 1,193,960, dated August 8, 1916, Serial No. 813,044, filed January 19, 1914. Application for reissue filed August 5, 1918. Serial No. 248,494.

*To all whom it may concern:*

Be it known that I, GEORGE J. AIGNER, a citizen of the United States of America, residing at Chicago, in the county of Cook and State of Illinois, have invented new and useful Index-Tabs, of which the following is a specification, reference being had to the accompanying drawings, illustrating same.

My invention relates to indexes, for use in connection with books, various kinds of letter and card files, loose-leaf arrangements, etc. It may be used in various places and adapted for various conditions.

One object of my present invention is to provide improved index tabs as herein set forth.

Another object of my invention is to provide an improved strip of index tabs, constructed so that the single or individual tabs of the strip may be readily and quickly detached therefrom for use.

Still another object of my invention is to provide in such index tabs improved attachable ends therefor projecting at different angles from the body of the tab for purposes substantially as herein set forth.

Other objects will be apparent from the following specification.

In the accompanying drawings illustrating the preferred forms of my invention, Figure 1 is a side elevation of a strip of index tabs of this invention; Fig. 2 is a top end view of the strip of tabs of Fig. 1; Fig. 3 is a side elevation of a single tab taken from a strip of tabs similar to the strip shown in Fig. 1; Fig. 4 is a side elevation of a strip of another form of index tabs of this invention; Fig. 5 is a top end view of the strip of tabs of Fig. 4, showing the attachable ends of the tabs spread apart for moistening so that they may be glued to their proper sheets for use; and Fig. 6 is a side elevation of a single tab taken from a strip of tabs similar to the strip shown in Fig. 4.

Like characters refer to like parts in the several figures.

Index tabs heretofore in use have been made with the whole set of tabs in a continuous strip which was not cut part way across between the different letters or characters of the set so as to enable them to be readily detached from the strip for use, or else the individual tabs of a set have been cut entirely apart from each other and placed in a box. In the former class of tabs it is necessary to employ a pair of scissors, a knife, or some other instrument for cutting the individual tabs apart, and then with such an instrument the cutting cannot be uniformly done so that the individual tabs after being cut apart will have a uniform appearance, a uniform width, etc.; and in the latter form of tabs it is necessary to sort out the individual tabs and arrange them in their proper order before gluing them to their respective sheets, which is a considerable bother and consumes considerable time.

In my present invention I have devised an improved tab which eliminates all of the objectionable features above mentioned. I accomplish this by cutting the individual tabs A, B, C, D, E, etc., of a strip of tabs, nearly apart from each other, as shown by the lines 1 1 which represent cuts in the strips of tabs, but still leaving the tabs of a strip all connected together by narrow portions 2 2, preferably along the rear edge of the strip. With these cuts 1 1 between the individual tabs of a strip, extending nearly but not quite across the strip, the tabs of a set are kept in their proper order, thus eliminating the objectionable feature of having to sort them out where they are cut clear apart from each other as above stated, and at the same time they may be readily and quickly separated from each other by simply tearing the small portions 2 2 at the edge of the strip, by hand, thus eliminating the necessity of having to cut the individual tabs apart from each other entirely across the strip as in the tabs above mentioned. Furthermore, by employing a cut 1 instead of a wider punched-out portion, the portions 2 2 will tear across more nearly in line with the cut 1 when the individual tabs are torn apart, thus giving a better and more uniform appearance to the edges and corners of the individual tabs after they are torn apart.

In all of the tabs illustrated, each tab comprises an outside portion 3, which may be of leather, celluloid, paper, canvas, cloth, etc., and an inner portion or filler 4 for stiffening the front portion of the tab, the outside portion 3 being folded around the inside portion 4, preferably as shown in Figs. 2 and 5, and suitably glued or cemented thereto. The filler 4 may be of paper, canvas, leather, cloth, or any other suitable material, and in the tabs of this invention I preferably make the filler 4 of the same color as the outside portion 3 of the tab so as to present a better appearance along the edges of the tabs.

The inner surfaces 5 5 of the tabs, back of the filler strips 4 4, are preferably gummed, so that they may be moistened and glued to their respective sheets very readily. In moistening the surfaces 5 5 of the tabs, the legs 6 6 thereof may be spread apart as shown in Fig. 5 and pressed or rubbed against any suitable moist sponge or other object.

Each of the individual tabs shown in Fig. 4 is constructed as shown in Fig. 6, that is, with one of the attachable legs 6 extending upwardly from the body portion of the tab and the other attachable leg 6 extending downwardly from the body portion of the tab, preferably as shown. This construction is provided so as to reinforce the sheet to which the tab is attached for use, adjacent to the tab, and thus prevent the sheet from tearing in case the tab is pulled either up or down when turning the sheet. This construction greatly lengthens the life of usage of the sheets and tabs.

The characters on a set of tabs may be the letters of the alphabet, the numerals, the days of the month, abbreviations for the months, abbreviations for States, names of individuals, companies, etc., and in fact anything desired.

I do not wish to limit this invention to the cuts 1 1 precisely as shown, to the formation of the legs 6 6 of the tab of Fig. 6 precisely as shown, nor to all of the various other details herein set forth, as various modifications thereof may be made or utilized without departing from the scope of the appended claims.

What I claim as my invention is:

1. A series of index tabs arranged in the form of a strip, each of the tabs having a horizontal body portion composed of a folded portion, and attachment legs for each of the tabs, projecting angularly from the rear end of the horizontal body portion, one upwardly and one downwardly when the tab is attached to a vertically-disposed sheet, the attachment legs of the series of tabs being attached to each other at their extreme rear edges only, for purposes substantially as set forth.

2. A set of index tabs of the character set forth comprising a series of tabs normally in a strip and provided with different characters thereon arranged consecutively according to a predetermined arrangement, the said strip comprising a folded portion having a front portion for the characters and a rear portion for providing attachment legs for the individual tabs, the said tabs being cut entirely apart through the said front portion between the said characters and through the said rear portion to within a short distance from the rear edge of the strip whereby attachments between the individual tabs are provided at the rear edge only of the strip, said attachments holding the said tabs in their predetermined arrangement in the said strip but permitting of them being readily torn apart by hand.

3. In a strip of index tabs constructed of a longitudinally-folded strip of suitable material having a series of different designating characters thereon arranged therealong near the folded edge of the strip according to a predetermined arrangement, the folded strip having transverse incisions therethrough between the consecutive characters extending across the folded strip except for a short distance whereby slight attachments are provided between the individual tabs of the strip holding them in their predetermined arrangement in the strip but permitting of them being easily detached from each other for use.

4. In a strip of index tabs constructed of a longitudinally-folded strip of suitable material having a series of different designating characters thereon arranged therealong near the folded edge of the strip according to a predetermined arrangement, the folded strip having incisions therethrough almost severing the portions containing the respective said characters from each other but leaving slight attachments between the said portions to maintain them in their predetermined arrangement in the strip and at the same time permit of them being easily separated from each other for use.

5. A series of index tabs arranged in the form of a strip, each of the tabs having a horizontal body portion composed of a folded portion, and attachment legs for each of the tabs projecting angularly from the rear end of the horizontal body portion, one upwardly and one downwardly when the tab is attached to a vertically-disposed sheet, and relatively narrow readily-severable attachments between the individual tabs of the strip holding them in their predetermined arrangement in the strip but permitting of them being readily detached from each other for use.

As inventor of the foregoing I hereunto subscribe my name, this 3 day of Aug., 1918.

GEORGE J. AIGNER.

Witnesses:

LILLIAN RIECK,
MAX BEHM.